United States Patent
Nellis

(10) Patent No.: US 9,995,054 B1
(45) Date of Patent: Jun. 12, 2018

(54) POOL ENCLOSURE ANCHOR KIT

(71) Applicant: Robert Nellis, Cape Coral, FL (US)

(72) Inventor: Robert Nellis, Cape Coral, FL (US)

( * ) Notice: Subject to any disclaimer, the term of this patent is extended or adjusted under 35 U.S.C. 154(b) by 0 days. days.

(21) Appl. No.: 15/651,515

(22) Filed: Jul. 17, 2017

(51) Int. Cl.
*E04H 9/14* (2006.01)
*E04B 1/92* (2006.01)
*E04B 7/02* (2006.01)
*E06B 9/52* (2006.01)

(52) U.S. Cl.
CPC ............... *E04H 9/14* (2013.01); *E04B 1/92* (2013.01); *E04B 7/022* (2013.01); *E06B 9/52* (2013.01)

(58) Field of Classification Search
CPC ... E04H 9/14; E04B 1/92; E04B 7/022; E06B 9/52
USPC .......... 52/3, 4, 5, 23, 148, DIG. 11, DIG. 12
See application file for complete search history.

(56) References Cited

U.S. PATENT DOCUMENTS

| | | | | |
|---|---|---|---|---|
| 3,449,874 A * | 6/1969 | Beaupre | ............... | E02D 5/80 135/118 |
| 4,866,797 A * | 9/1989 | Vollan | ............... | E04B 1/34352 52/126.6 |
| 5,319,896 A * | 6/1994 | Winger | ............... | E04B 7/00 52/23 |
| 6,176,056 B1 * | 1/2001 | MacKarvich | ............... | E02D 5/801 248/499 |
| 6,298,629 B1 * | 10/2001 | Ador | ............... | A62B 35/005 182/3 |
| 7,392,620 B1 * | 7/2008 | Watson, Jr. | ............... | E04H 9/14 52/23 |
| 7,412,805 B2 * | 8/2008 | Parrish | ............... | B29C 70/025 52/223.13 |
| 7,805,891 B2 * | 10/2010 | Lozier | ............... | E04H 9/14 52/23 |
| 2010/0043315 A1 * | 2/2010 | Fannon | ............... | E04G 23/0218 52/146 |
| 2010/0212251 A1 * | 8/2010 | Llorens | ............... | E04B 7/045 52/712 |
| 2012/0090249 A1 * | 4/2012 | Schor | ............... | E04H 9/14 52/4 |

FOREIGN PATENT DOCUMENTS

| | | | | |
|---|---|---|---|---|
| CA | 2287797 A1 * | 4/2001 | ............ | E04B 7/045 |
| FR | 2691736 A1 * | 12/1993 | ............ | E04B 7/02 |

* cited by examiner

*Primary Examiner* — Adriana Figueroa
(74) *Attorney, Agent, or Firm* — McHale & Slavin, P.A.

(57) ABSTRACT

Disclosed is an anchor kit for pool enclosures. The anchor kit includes top and bottom gripper plates secured to a hollow pool enclosure frame creating a solid I-beam. The gripper plates and ground anchors are permanently installed. Upon the event of a wind storm, an adjustable tie down is placed between the gripper plate and an anchor installed in the earth. The assembly effectively prevents lifting of the frame during the wind event.

5 Claims, 2 Drawing Sheets

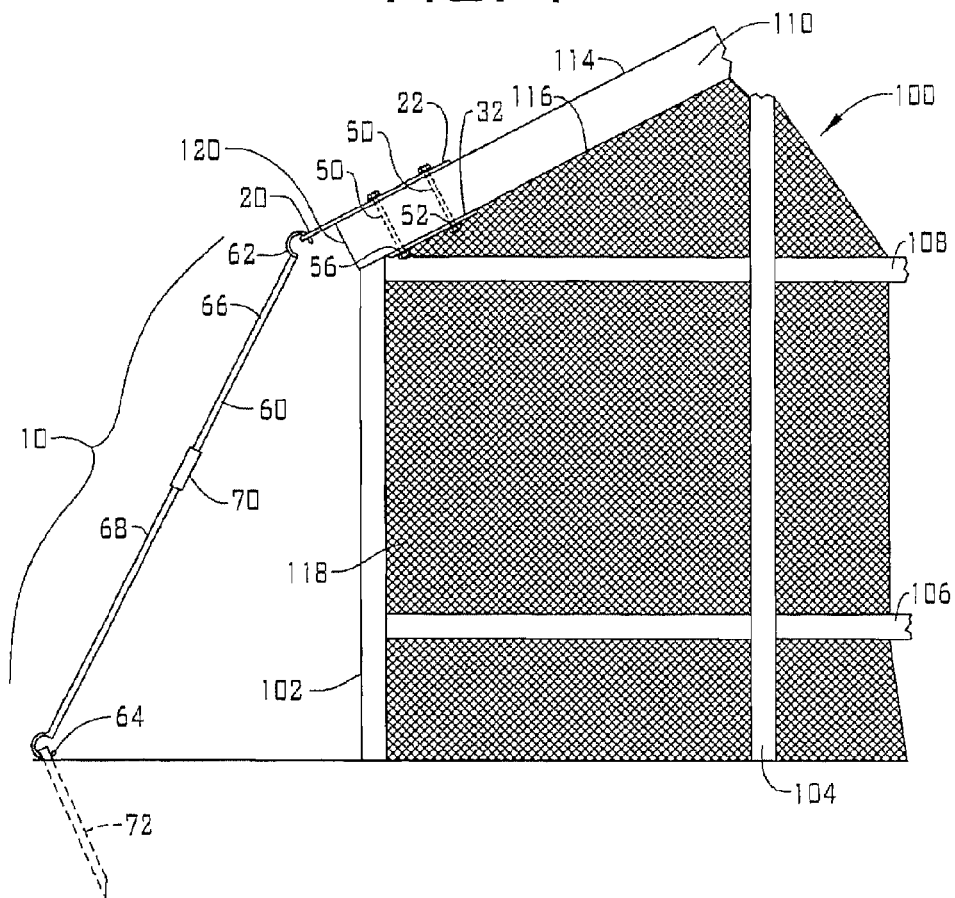
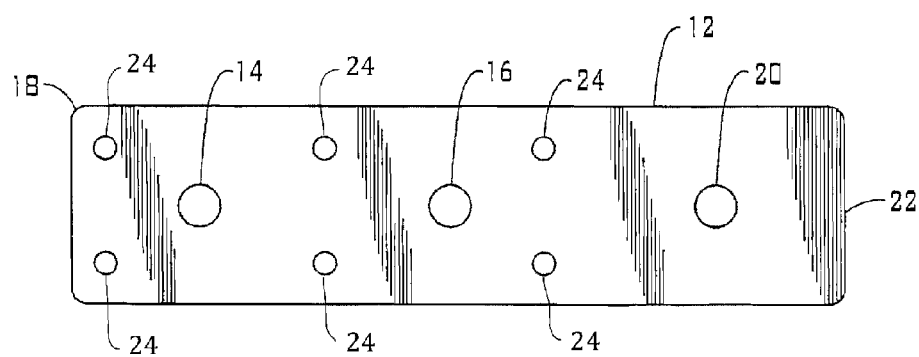

POOL ENCLOSURE ANCHOR KIT

FIELD OF THE INVENTION

The invention is directed to the field of preventing damage from wind and, in particular, to a pool enclosure anchor kit for securing a pool enclosure in high winds.

BACKGROUND OF THE INVENTION

Swimming pools placed within a screened enclosure transform a home into a unique living space. The enclosed area allows those living in tropical areas to use the swimming pool at a time when mosquitoes are present. The enclosed area further provides an extension to the living area, wherein the homeowner can leave the windows and doors leading to the enclosed area open, knowing that screening will prevent bugs from entering the home.

Unfortunately, the screened enclosure is prone to wind damage. The majority of damage to screen enclosures comes from wind flowing over the arched roof of the enclosure, creating low pressure lifting. Essentially, the arched roof creates an airfoil shape that is effective in generating lift; lift being the component of a force that is perpendicular to an oncoming wind flow. Rain water can quickly coat a screen surface, which results in the screen panels creating an airfoil surface that assists in the lifting. As with any airfoil, the greater the wind flow, the more lift provided. In high winds, especially hurricane force winds, the airfoil effect uproots the frame from the base, either by pulling the screws up or pulling the frame out of the screws holding the frame to the ground. Essentially, the enclosure is lifted rather than being blown over. Even a perfectly flat portion of a pool enclosure can create lift. Further, the frames are constructed from aluminum and the tie down screws are constructed from metal. The resulting electrolysis will start to disintegrate the tie down screws, starting at the time of installation. Electrolysis is typically not uncovered until a screw breaks. The result is that the homeowner cannot rely upon the rated wind speed of the enclosure, as the holding strength of the screws cannot be predicted once electrolysis begins.

U.S. Pat. No. 5,537,786 discloses a hurricane-resisting building roof structure tie-down. The disclosure is directed to a building having its roof structure secured to its vertical wall structure by tie-down straps, a plurality of anchors are secured to the foundation in pairs, on opposite sides of the building, and a tie-down strap guide is secured over the ridge of the building between the related anchors. The tie-down straps are connected to anchors by tensioning devices which include a ratchet, and may include a connector to permit the ratchet to be disposed at a distance from the anchor.

U.S. Pat. No. 5,560,156 discloses a hurricane tie-down member to restrain roof trusses experiencing high wind conditions by optimally transferring dynamic roof uplift forces from a planar saddle portion to a vertical wall via a pair of side arm members and flat anchor surfaces.

U.S. Pat. No. 7,654,042 discloses a cable tie down system having a lower support provided between the side edges of the roof beneath. The lower support is in contact with the roof adjacent to the exterior edge. Upper supports are provided above and in contact with the roof. The upper supports include upper exterior, interior and intermediate supports. The upper exterior support is adjacent to the exterior edge. The upper interior support is adjacent to the interior edge. Central supports extend between the interior and exterior edges of the roof. The lower support is provided below and the upper supports are provided above.

U.S. Patent Publication No. 2008/0072487 discloses an apparatus and system to minimize damage to structures or trees during high winds. A temporary apparatus to prevent damage to structures such as screen enclosures during high winds. The apparatus uses a proprietary bracket specifically designed for target structure members that is permanently attached to the structural member; a ground anchor, which may be any permanent or temporary fixture that may be used as a ground anchor; and any tie-down material or method that may be used to temporarily tie said bracket to said ground anchor.

U.S. Pat. No. 1,864,403 discloses an anchoring device for buildings, an object being to provide means whereby houses and other buildings may be securely anchored to the ground using ties downs that fit over the roof of a house.

What is lacking in the industry is an anchor kit having all the items needed to anchor a pool screen enclosure in a triangular structure in a position to prevent lifting of the pool screen enclosure during high wind events.

SUMMARY OF THE INVENTION

Disclosed is an anchor kit for pool enclosures. The anchor kit includes top and bottom gripper plates that are secured to the end of a hollow pool enclosure frame. The bottom aluminum plate has six (6) holes to accommodate six (6) stainless steel self tapping screws that fasten the plate to the bottom of the roof beam. It also has two (2) larger holes to allow the long stainless steel bolts to fasten the bottom aluminum gripper plate through the roof beam to connect to the top aluminum gripper plate. The top aluminum gripper plate has matching six (6) screw holes to fasten the top aluminum gripper plate to the top of the hollow roof beam and two (2) through holes to complete the "grip" through the hollow roof beam to the bottom aluminum plate creating a solid I-beam girder. The top aluminum plate includes an overhanging tab having an aperture for use in connection with an adjustable strap that attaches to a stake for anchoring screened enclosure to the ground, forming a triangular support.

An objective of the invention is to provide a pool enclosure frame anchor kit specifically tailored to correct a structural deficiency with pool enclosures by forming a triangular anchor platform, creating reinforced ground fastening of the frame for maximum stability. This kit is specifically designed to fit the dimensions of the industry standard pool enclosure frame.

Another objective of the invention is to provide a low cost complete anchor kit specific to pool enclosures.

Still another objective of the invention is to provide gripper plates that are bolted to the frame enclosure and surround the hollow rafter beam, increasing the structural strength of the beam and providing an adjustable tie down strap. Adjustable tie down straps enable ground anchors to be installed variable distances from the base of the pool enclosure.

Another objective of the invention is to provide a ground anchor to form a triangular attachment, the strongest proven structural support, needed for holding the frame firmly in place during high wind conditions.

Other objectives and further advantages and benefits associated with this invention will be apparent to those skilled in the art from the description, examples and claims which follow.

BRIEF DESCRIPTION OF THE DRAWINGS

FIG. 1 is a pictorial of a pool enclosure with the anchor kit attached thereto;

FIG. 2 is a plane view of the top gripper plate.

DETAILED DISCLOSURE OF THE PREFERRED EMBODIMENT

Figure 3:
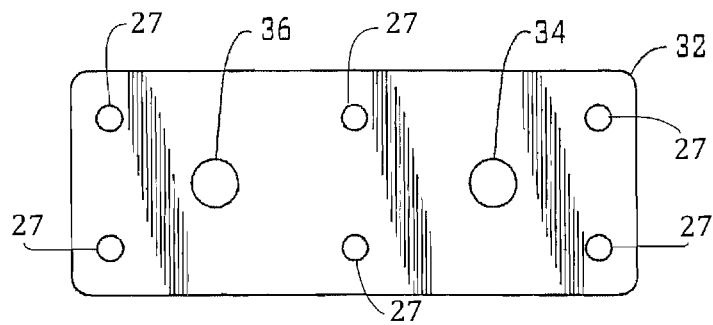
FIG. 3 is a plane view of the bottom gripper plate.
Figure 4:
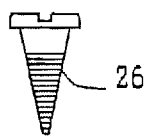
FIG. 4 is a side view of the screw attachment.
Figure 5:
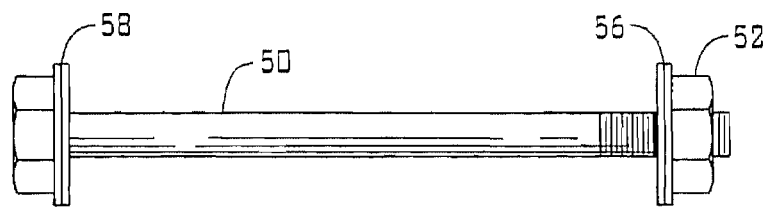
FIG. 5 is a side view of the bolt attachment.
Figure 6:
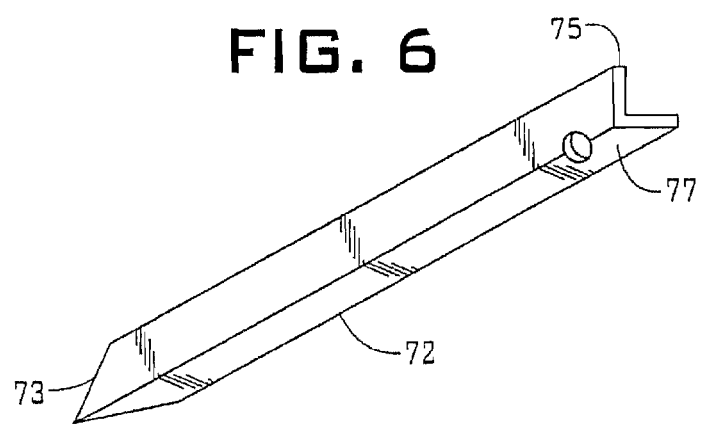
FIG. 6 is a perspective view of the angle iron anchor.

A detailed embodiment of the instant invention is disclosed herein. Specific functional and structural details disclosed herein are not to be interpreted as limiting, but merely as a basis for the claims and as a representation basis for teaching one skilled in the art to variously employ the present invention in virtually any appropriately detailed structure.

Now referring to the Figures, set forth is a pool screen enclosure 100 depicted by vertical frame members 102 and 104 and horizontal frame members 106 and 108. Top frame member 110 is typically wide by 8" tall and is secured to the vertical frame members. The top frame member 110 has an upper surface 114 and a lower surface 116 spaced apart by side walls forming a hollow cavity therebetween. The top frame member endpiece 120 abuts the vertical frame member 102. The frame members described are typical for a pool enclosure; the actual number of frame members and orientation is dependent upon the size and style of the enclosure. However, all pool enclosures require a top frame member, to which this invention applies.

Screening 118 is placed within the frame members so as to provide an enclosure around the pool. The screening 118 can be sized to prevent larger flying insects, such as mosquitoes, from passing through. Alternatively, the screening can be tightly meshed to prevent smaller flying insects, such as no-see-ums (Ceratopogonidaes), from passing through. Hurricane screens are also available, all of which determine the lift load factor on the frame during a wind event. The no-see-ums screen places an exceptional load on the frame during a rain/wind event, as the screen spacing allows water to form a sheet which permits very little wind passage therethrough.

A pool enclosure anchor kit 10 consists of an aluminum top grip plate 12 having dimensions of 9.5" long, 1¼" wide and ⅛" thick. The top grip plate 12 has two 5/16" apertures 14, 16 located along a first end 18 and one 5/16" aperture 20 located along a second end 22. The top grip plate 12 is placed on the upper surface 114 of the frame endpiece 120 with the aperture 20 extending over an end 120 of the frame member 110. The top grip plate 12 includes six 3/16" apertures 24 located on each side of the apertures 14 and 16. Six #10×¾" Self Tapping Stainless Steel Hex Head Screws 26 are placed into the apertures 24 and used to secure the top grip plate 12 to the upper surface 114 of the frame 110.

An aluminum bottom grip plate 32 having dimensions of 4.5" long, 1¼" wide and ⅛" thick includes two 5/16" apertures 34, 36 positioned to axially align with top grip plate 12 apertures 14 and 16. The bottom grip plate 32 is placed on the lower surface 116 of the top frame member 110, and held in position by six #10×¾" Self Tapping Stainless Steel Hex Head Screws 26 placed into apertures 27 and used to secure the bottom grip plate 32 to the lower surface 116 of the top frame member 110.

Once the top grip plate 12 and bottom grip plate 32 are fastened to the top frame member 110, a hole is drilled through the frame member 110, aligning top grip apertures to the bottom grip apertures. A further hole is drilled, aligning top grip aperture 16 with lower grip aperture 34. A first Stainless Steel Hex Bolt ¼"×10½" 50 is placed through apertures 14 and 36 and held in place with stainless steel locking hex nut 52. In the preferred embodiment, washers 56 and 58 help distribute the loading. A second Stainless Steel Hex Bolt ¼"×½" 50 is placed through apertures 16 and 34 and held in place with locking hex nut 56. It is noted that aperture 20 extends beyond the endpiece 120.

A ratchet tie down strap 60 having a first end 62 releasably securable to the top grip plate 12 and a second end 64 securable to an angle iron anchor 72; the angle iron anchor 72 having an insertion end 73 and upper end 75 with at least one aperture 77 for receipt of the tie down strap attachment. The tie down strap 60 is formed from flexible straps 66 and 68 with an adjustable ratchet clasp 70 used to adjust the length between the top grip plate 12 and the angle iron anchor 72. The ratchet tie down strap 60 is adjustable, having a width of 1" and a length of 30' with hooks secured to opposite ends for ease of coupling to the top grip plate and anchor. The angle iron anchor 72 is 1.5" wide by 10" long.

The top grip plate 12 and the bottom grip plate 32 remain fastened to the screen frame enclosure, and the angle iron anchor 72 is permanently placed in the ground. The ratchet tie down strap 60 are installed before a hurricane to effectively prevent the frame enclosure from lifting. The kit is shipped in, and can be stored in, a Zip lock plastic bag.

All patents and publications mentioned in this specification are indicative of the levels of those skilled in the art to which the invention pertains. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A pool screen enclosure anchor for securing a conventional pool screen enclosure frame during hurricane force winds, said anchor kit comprising:

an aluminum top grip plate having dimensions of 9.5" long, 1¼" wide and ⅛" thick, said top grip plate having two 5/16" apertures located along a first end and a third 5/16" aperture located along a second end, said first end of said top grip plate permanently attached to an upper surface of a pool screen enclosure frame endpiece with a plurality of screws wherein said second end of said grip plate is arranged to overhang an end of said enclosure frame endpiece;

an aluminum bottom grip plate having dimensions of 4.5" long, 1¼" wide and ⅛" thick, said bottom grip plate having two 5/16" apertures positioned to axial align with top grip said 5/16" apertures, said bottom grip plate placed on a lower surface of said frame enclosure endpiece and permanently attached thereto with a plurality of screws;

a bolt placed through each said axial aligned 5/16" apertures and associated frame enclosure endpiece with a nut fastening said top grip plate and said bottom grip plate to said frame enclosure endpiece;

an angle iron anchor for placement in the earth a distance from said frame enclosure endpiece, said angle iron anchor having an aperture located along a first end;

a ratchet tie down strap having a first end releasably securable to said top grip plate 5/16" aperture located along said second end, and a second end of said tie down strap securable to said aperture located in a permanently installed angle iron anchor;

wherein said top grip plate and said bottom grip plate remain permanently fastened to said pool screen frame enclosure endpiece, whereby said ratchet tie down strap is installed for securing said endpiece to said angle iron anchor to prevent said frame enclosure endpiece from lifting when subjected to hurricane force winds.

2. The pool screen anchor according to claim 1 wherein said angle iron anchor is 1.5" wide by 10" long, with said aperture defined by a 5/16" opening located along said first end.

3. The pool screen anchor according to claim 1 wherein said ratchet tie down strap is adjustable, having a width of 1" and a length of 30' with hooks secured to opposite ends of said ratchet tie down.

4. The pool screen anchor according to claim 1 wherein said screws placed on said upper surface are six self tapping screws.

5. The pool screen anchor according to claim 1 wherein said screws placed on said lower surface are six self tapping screws.

* * * * *